United States Patent

[11] 3,566,987

[72] Inventor Richard M. Franzel
Rte 1, Box 580, Mound, Minn. 55364
[21] Appl. No. 765,829
[22] Filed Oct. 8, 1968
[45] Patented Mar. 2, 1971

[54] AUTOMATIC STABILITY CONTROL
8 Claims, 1 Drawing Fig.
[52] U.S. Cl. .................................................. 180/103,
188/177
[51] Int. Cl. ..................................................... B60t 7/20
[50] Field of Search .......................................... 180/103,
104; 303/7; 188/112, 177, 110; 280/112

[56] References Cited
UNITED STATES PATENTS
2,856,036 10/1958 Mullen ........................ 188/112
2,917,126 12/1959 Phillips ........................ 180/104
3,053,348 9/1962 Stair ............................ 188/112
3,288,240 11/1966 Franzel ........................ 180/103
3,398,991 8/1968 Compton ..................... 180/104X Primary Examiner—Kenneth H. Betts ABSTRACT: An improved stability control system for towed vehicles to overcome the inherent swaying and swerving tendency by the provision of two sensing units responsive to lateral acceleration, one sensing unit (a) located in the rear of the towed vehicle and the other sensing unit (b) located in the front of the towed vehicle or in the prime mover which, when activated by lateral acceleration forces in the prescribed way will automatically cause the brakes of the towed vehicle to be energized and immediately apply corrective action, the prescribed operation is such that when the towed vehicle is disturbed and starts to sway or swerve, sensor (a) will experience lateral acceleration while sensor (b) experiences little or none, this condition will automatically cause the brakes of the towed vehicle to apply corrective action, if sensor (b) receives approximately the same lateral acceleration such as in a slow 90° turn or a moderate turn at highway speeds, sensor (b) will cancel the signal from sensor (a) thus, eliminating unnecessary braking applications, further if catastrophic conditions exist, such as in a "jackknife" skid which results in extreme lateral acceleration, sensor (b) will reinstate the signal from sensor (a) and provide immediate corrective braking action to the towed vehicle.

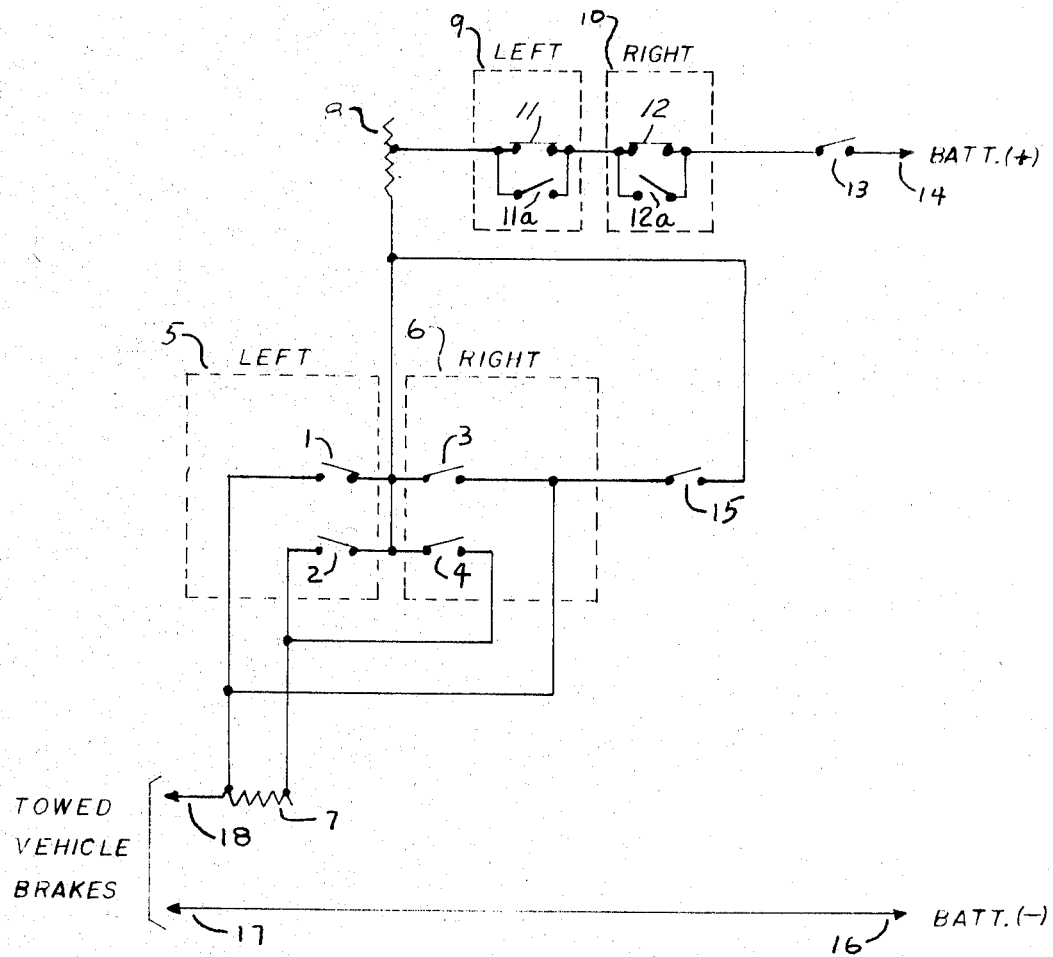

AUTOMATIC STABILITY CONTROL

This invention relates broadly to means and method of imparting automatic stability control to towed vehicles and introduces a modified concept which is an improvement on my U.S. Pat. No. 3,288,240 issued Nov. 29, 1966.

The patent identified above discloses an automatic sensing and control means to overcome the inherent swaying and swerving tendency of towed vehicles, such as travel trailers, semitrailers, utility trailers, and the like, while the same are in over the road transit.

It is well recognized that when a towed vehicle, such as a travel trailer, is towed behind a car or truck there is an inherent tendency to sway or swerve when traveling at moderate or high speeds and thus cause hazardous or dangerous driving conditions. This condition is generally brought about by factors such as travel over uneven road beds, making sudden turns required in normal travel, encountering side or gusty winds, and meeting or passing in close proximity to large vehicles such as trucks traveling at high speeds wherein a vacuum or pressure area is created by the passage of such vehicles. Further, it is well known that when a towed vehicle is in a swaying or swerving condition that if the brakes of the towed vehicle are applied alone, corrective action will occur. It also follows that the sooner corrective action takes place the greater the chance of avoiding a hazardous or dangerous condition. It takes about three-fourths of a second for an alert driver to manually respond to a given driving stimulus under the best conditions; this means that a car-trailer combination traveling at 60 m.p.h. would actually go at least 66 feet after a signal to act has been recieved. This time lag could be very critical because the first few moments of any swaying or swerving action of the trailer are extremely important in determining the total extent and magnitude of the swaying or swerving action.

For the purpose of this application this embodiment of this invention is shown and described in detail for an electric brake system for towed vehicles, however, it is understood that comparable functions can be utilized so that this basic concept can be applied to all types of brake systems that are used on towed vehicles.

The principle object of this invention is to provide an automatic means and method of eliminating unnecessary or superfluous braking applications by said automatic stabilization system disclosed in said patent that are brought about by conditions such as making a slow 90° turn or a moderate turn at highway speeds.

A further object of this invention is to provide a simplified automatic sensing and control means of such swaying or swerving action of a towed vehicle by means of sensing means cooperating with the wheel brake system of the towed vehicle.

A still further object of this invention is to provide an automatic stabilization system for a towed vehicle that is independent of the regular braking action of the prime mover.

Another object of this invention is to provide an automatic stabilization system that utilizes the regular brake system of the towed vehicle and applies the same braking action to both sides of the towed vehicle.

A still further object of this invention is to provide a simplified automatic stabilization system that permits the driver to check said system and adjust the amount of stabilization correction desired while the towed vehicle and prime mover are in motion.

These and other objects of the invention will become apparent from the following specification and claims when taken in conjunction with the accompanying drawing which forms a part of this application.

All or combinations of the results heretofore enumerated may be used in systems embodying the features and objects of the present invention, and therefore in some cases certain of the devices hereinafter to be described may be eliminated without detriment to the proper and efficient functioning of the remaining devices.

To the above end, generally stated, the invention consists of the following devices and combination of devices, hereinafter described and defined in the claims. The FIG. shows a wiring diagram illustrating the electric circuit for operating the system.

Referring to FIG. 1 sensing units 5 and 6 are used to measure lateral acceleration forces applied to the towed vehicle and comprise four mercury switches 1 and 2 for the left side and 3 and 4 for the right side of the towed vehicle and one current limiting resistor 7. The mercury switches 1 and 2, left side, and 3 and 4, right side represent a two step braking action control. The mercury switches 2 and 4 are so they will close for a relatively small lateral acceleration force in the respective directions, and switches 1 and 3 will close for a greater lateral acceleration force in the respective directions. Current limiting resistor 7 determines the amount of power applied to the brakes of the towed vehicle by the automatic stabilization system. Rheostat 8 located in the prime mover within easy reach of the driver of same is used to make a semipermanent adjustment for the degree of braking desired. This adjustment can be very important because driving and road conditions such as rain, snow, sleet and the like can change quickly and may require different degrees of braking action for optimum performance. Also, this adjustment feature permits precise matching of the trailer load to the degree of correction best suited to the car-trailer combination. Test switch 15 is connected in parallel with mercury switches 1 and 3 and permits the driver to test and calibrate the automatic stabilization system by adjusting rheostat 8 while in transit. Sensing units 9 and 10 are used to measure lateral acceleration forces applied to the prime mover or front end of the towed vehicle and comprise four mercury switches—11 and 11a for the left side, 12 and 12a for the right side. Mercury switches 11 and 12 are normally closed and so they will open for a given lateral acceleration force in the respective directions. Mercury switches 11a and 12a are normally open and are so they will close for a given lateral acceleration force in the respective directions.

Referring again to FIG. 1, the following is a sequence of operation in which corrective forces are applied to the towed vehicle to overcome or minimize the lateral acceleration forces caused by swaying or swerving movements of the towed vehicle induced by road, air current or turning action on the running gear or body of said towed vehicle. It should be noted that the towed vehicle generally has ground contact only near its center and the cross-sectional area is usually considerable larger than the prime mover thus, for a given disturbance said towed vehicle is inherently subject to greater lateral swaying and swerving movements.

CONDITION A = Towed vehicle only receives lateral acceleration to the left.

1. Mercury switch 2 closes because of lateral acceleration to the left.
2. Current from prime mover battery flows through wire 14, through master ON-OFF switch 13, through mercury switches 11 and 12, and into brake adjustment rheostat 8 which is used to make semipermanent adjustment for the degree of braking desired.
3. Current flow continues through mercury switch 2 and resistor 7 which reduces the current to the desired amount for proper step 1 braking action.
4. Current flow continues to the brakes on both sides of said towed vehicle.
5. This causes a drag on both sides of said towed vehicle which immediately reduces the swaying or swerving action of said towed vehicle.
6. As soon as corrective action has been taken, mercury switch 2 will open because there is no lateral acceleration force to hold it closed, thus removing braking action on both sides of said towed vehicle.
7. If the lateral acceleration force is greater than above example, mercury switch 1 will also close, this action will then apply more power to the brakes because current will flow through only part of resistor 7. This condition will then apply step 2 correction and repeat the sequence of action as described above except the braking force is greater.

CONDITION B = Towed vehicle only receives lateral acceleration to the right.
1. Mercury switch 4 closes because of lateral acceleration to the right.
2. Same action takes place as in Condition A because mercury switch 4 is in parallel with mercury switch 2.
3. If greater swaying or swerving action takes place, mercury switch 3 will also close and thus give greater braking action, the cycle of operation will be the same as for Condition A.

CONDITION C = Towed vehicle and prime mover receive lateral acceleration to the left (as in typical slow speed 90° turn or a moderate turn at highway speeds).
1. Mercury switch 2 closes and mercury switch 11 opens because of lateral acceleration to the left.
2. Mercury switch 11 removes electrical power, thus no corrective braking action occurs.
3. As soon as lateral acceleration force is removed, mercury switch 2 opens and mercury switch 11 closes restoring normal condition.

CONDITION D = Towed vehicle and prime mover receive lateral acceleration to the right (as in typical slow speed 90° turn or a moderate turn at highway speeds).
1. Mercury switch 4 closes and mercury switch 12 opens because of lateral acceleration to the right.
2. Mercury switch 12 removes electrical power, thus no corrective action occurs.
3. As soon as lateral acceleration force is removed, mercury switch 4 opens and mercury switch closes restoring normal condition.

CONDITION E = Towed vehicle and prime mover receive extreme lateral acceleration to the left (as in a catastrophic "jacknife" skid).
1. Mercury switches 1 and 2 close because of extreme lateral acceleration to the left on both ends of the towed vehicle and prime mover.
2. Mercury switch 11 opens and mercury switch 11a closes immediately.
3. Current from prime mover battery flows through wire 14, through master ON - OFF switch 13, through mercury switches 12 and a and into brake adjustment rheostat 8.
4. Current flow continues through mercury switch 1 and part of resistor 7 for proper step 2 braking action.
5. Current flow continues to the brakes on both sides of said towed vehicle.
6. This causes a drag on both sides of said towed vehicle which immediately reduces the swaying or swerving action of said towed vehicle.
7. As soon as corrective action has been taken mercury switches 1, 2 and 11a will open and mercury switch 11 will close because there is no lateral acceleration force to hold said mercury switches in their respective positions thus, removing braking action and restoring normal condition.

CONDITION F = Towed vehicle and prime mover receive extreme lateral acceleration to the right (as in a catastrophic "jacknife" skid).
1. Mercury switches 3 and 4 close because of extreme lateral acceleration to the right on both ends of the towed vehicle and prime mover.
2. Mercury switch 1 opens and mercury switch 12a closes.
3. Current from prime mover battery flows through wire 14, through master ON - OFF switch 13, through mercury switches 12a and 11 and into brake adjustment rheostat 8.
4. Current flow continues through mercury switch 3 and part of resistor 7 for proper step 2 braking action.
5. Current flow continues to the brakes on both sides of said towed vehicle.
6. This causes a drag on both sides of said towed vehicle which immediately reduces the swaying or swerving action of said towed vehicle.
7. As soon as corrective action has been taken mercury switches 3, 4, and 12a will open and mercury switch 12 will close because there is no lateral acceleration force to hold said mercury switches in their respective position thus, removing braking action and restoring normal condition.

The sensor for the towed vehicle can be mounted in many possible locations, however, when it is mounted near the rear of the towed vehicle it provides a signal proportional to the lateral acceleration forces experienced by said towed vehicle.

The sensor for the prime mover can also be mounted in many possible locations, however, when it is mounted approximately midway between the front and rear wheels it provides a signal proportional to the lateral acceleration forces experienced by said prime mover. It should be noted that if said sensor is mounted near the front end of said towed vehicle rather than on said prime mover, a similar response to lateral acceleration will be experienced by said sensor because the front end of said towed vehicle is mechanically coupled by the hitch of said prime mover.

Provisions have been made for simple and easy calibration and testing of the automatic stabilization system by the driver while traveling, this is accomplished by placing a single pole normally open pushbutton switch 15 in parallel with mercury switch 3 whereby when said pushbutton switch 15 is depressed will cause corrective type braking action to occur thereby permitting the driver to evaluate and adjust the degree of said stabilization control best suited to the vehicle combination and road conditions.

This concept embodies the following functions and principles:
1. A sensing means that will sense the lateral acceleration forces experienced by the towed vehicle.
2. A sensing means that will sense the lateral acceleration forces experienced by the prime mover.
3. A wheel braking system for the towed vehicle that can be independently and simultaneously controlled on both sides of said vehicle. This can be an electric, hydraulic, air, mechanical, etc. type system.
4. A control system such that when a substantial lateral acceleration or side force is experienced only by the towed vehicle as measured by the sensing means mounted in said towed vehicle is counteracted by the wheel brake system of said towed vehicle in such a way as to reduce or eliminate swaying or swerving of said towed vehicle.
5. A control system such that when a substantial lateral acceleration or side force, such as a slow speed 90° turn or a moderate turn at highway speeds, is experienced by the prime mover, as measured by the sensing unit mounted in said prime mover, or front end of towed vehicle no corrective action will occur on said towed vehicle because said sensor mounted in said prime mover or front end of towed vehicle will disconnect or cancel all corrective action of said control system.

It is further important to note that when a catastrophic driving condition occurs, such as when the towed vehicle approaches a "jacknife" condition, the prime mover and the front end of the towed vehicle will experience severe lateral acceleration. Under these conditions it would be a significant safety factor to have the brakes of said towed vehicle applied; this can be easily accomplished by placing an additional mercury switch that will close for extreme lateral acceleration in parallel with mercury switch 11 for the left side and another mercury switch that will do the same in parallel with mercury switch 12 for the right side.

While there are herein disclosed but a limited number of embodiments of the structure, process and product of the invention herein presented, it is possible to produce still other embodiments without departing from the inventive concept herein disclosed, and it is desired, therefore, that only such limitation be imposed on the appended claims as are stated herein or required by prior art.

I claim:

1. Automatic stability control means of imparting automatic stability control to ground vehicle combinations consisting of towed and prime mover vehicles to minimize or overcome the inherent undesirable effects of lateral acceleration forces due to swaying or swerving movements imparted to such vehicles in motion, said lateral acceleration forces being induced by material or atmospheric factors acting on the running gear and body thereof, said automatic stability control comprising automatic sensing means consisting of two separate sensors, one said sensor located in said towed vehicle and activated by lateral acceleration forces experienced by said towed vehicle in said motion the other said sensor located in said prime mover and activated by lateral acceleration forces experienced by said prime mover in said motion, said sensing means being in the form of accelerometers mounted in said towed vehicle and said prime mover and activated by said lateral acceleration forces of said vehicle combination in said motion, said accelerometers being connected to braking system of said towed vehicle, whereby when said swaying or swerving lateral acceleration forces are substantially applied only to said towed vehicle in said combination in one direction said accelerometer located on said towed vehicle will instantaneously and automatically energize said braking system of said towed vehicle to minimize or overcome undesirable effects of said lateral acceleration forces, when said lateral acceleration forces are applied to said prime mover and said towed vehicle in said combination in one direction simultaneously said accelerometer located in said prime mover will instantaneously cancel the signal from said accelerometer located in said towed vehicle, thus no said braking acting will occur when said prime mover is experiencing said lateral acceleration.

2. The structure of claim 1 wherein said sensing means consisting of two separate sensors, one located in said towed vehicle and the other located in said prime mover, is so constructed and arranged wherein said sensor located in said prime mover will cancel the action of said sensor located in said towed vehicle when a given predetermined lateral acceleration force is experienced by said sensor located in said prime mover, and further will reinstate said action of said sensor located in said towed vehicle when a greater given predetermined lateral acceleration force is experienced by said sensor located in said prime mover, substantially as described.

3. The structure of claim 1 wherein said sensor located in said towed vehicle is connected in parallel with a "pushbutton" type switch located in said prime mover within reach of driver of same and when depressed actuates said corrective braking action thereby permitting evaluation and testing of said automatic stabilization system, substantially as described.

4. The structure of claim 1 wherein said accelerometers of the mercury switch type are connected in series with the electric braking system of said towed vehicle via an electric circuit energized by the storage battery of said prime mover or said towed vehicle, substantially as described.

5. Automatic stability control means of imparting automatic stability control to ground vehicle combinations consisting of towed and prime mover vehicles to minimize or overcome the inherent undesirable effects of lateral acceleration forces due to swaying or swerving movement imparted to such vehicles in motion, said lateral acceleration forces being induced by material or atmospheric factors acting on the running gear and body thereof, said automatic stability control comprising automatic sensing means consisting of two separate sensors, one said sensor located in the rear end of said towed vehicle, the other said sensor located in the front end of said towed vehicle, both said sensors activated by said lateral acceleration forces experienced at said locations, said sensing means being in the form of accelerometers mounted in said locations and activated by said lateral acceleration forces of said vehicle combination in said motion, said accelerometers being connected to braking system of said towed vehicle, whereby when said swaying or swerving lateral acceleration forces are substantially applied only to said rear end of said towed vehicle in said combination in one direction, said accelerometer will instantaneously and automatically energize said braking system of said towed vehicle to minimize or overcome undesirable effects of said lateral acceleration forces, when said lateral acceleration forces are applied to said rear end of said towed vehicle and said front end of said towed vehicle in said combination in one direction simultaneously said accelerometer located in said front end of said towed vehicle will instantaneously cancel the signal from said accelerometer located in said rear end of said towed vehicle thus, no said braking action will occur when said rear end of said towed vehicle and said front end of said towed vehicle are experiencing said lateral acceleration in said direction.

6. The structure of claim 5, wherein said sensing means consisting of two separate sensors, one located in the rear end of said towed vehicle and the other located in the front end of said towed vehicle, is so constructed and arranged wherein said sensor located in the front end of said towed vehicle will cancel the action of said sensor located in the rear end of said towed vehicle when a given predetermined lateral acceleration force is experienced by said sensor located in the front end of said towed vehicle, and further will reinstate said action of said sensor located in said rear end of said towed vehicle when a greater given predetermined lateral acceleration force is experienced by said sensor located in the front end of said towed vehicle, substantially as described.

7. The structure of claim 5 wherein said sensor located in the rear end of said towed vehicle is connected in parallel with a "pushbutton" type switch located in said prime mover within reach of driver of same and when depressed actuates said corrective braking action thereby permitting evaluation and testing of said automatic stabilization system, substantially as described.

8. The structure of claim 5 wherein said accelerometers of the mercury switch type are connected in series with the electric braking system of said towed vehicle via an electric circuit energized by the storage battery of said prime mover or said towed vehicle, substantially as described.